(12) United States Patent
Koosam

(10) Patent No.: US 7,383,130 B1
(45) Date of Patent: Jun. 3, 2008

(54) WEATHER-BASED ACTIVITY ADVISOR

(75) Inventor: Vinod Koosam, Atlanta, GA (US)

(73) Assignee: The Weather Channel, Inc., Atlanta, GA (US)

( * ) Notice: Subject to any disclaimer, the term of this patent is extended or adjusted under 35 U.S.C. 154(b) by 130 days.

(21) Appl. No.: 11/013,849

(22) Filed: Dec. 16, 2004

(51) Int. Cl.
*G01W 1/00* (2006.01)
*G06F 19/00* (2006.01)

(52) U.S. Cl. .............................................. 702/3; 702/5
(58) Field of Classification Search ............... 702/3, 702/5, 150; 709/200, 201, 202, 219, 228
See application file for complete search history.

(56) References Cited

U.S. PATENT DOCUMENTS

| | | | |
|---|---|---|---|
| 4,725,886 A | 2/1988 | Galumbeck et al. | |
| 4,916,539 A | 4/1990 | Galumbeck et al. | |
| 5,140,419 A | 8/1992 | Galumbeck et al. | |
| 5,654,886 A * | 8/1997 | Zereski et al. | 702/3 |
| 6,018,699 A | 1/2000 | Baron et al. | |
| 6,209,026 B1 | 3/2001 | Ran et al. | |
| 6,236,330 B1 | 5/2001 | Cohen | |
| 6,356,905 B1 | 3/2002 | Gershmann et al. | |
| 6,360,172 B1 | 3/2002 | Burfiend et al. | |
| 6,427,101 B1 | 7/2002 | Diaz et al. | |
| 6,498,987 B1 | 12/2002 | Kelly et al. | |
| 6,542,825 B2 | 4/2003 | Jones et al. | |
| 6,584,447 B1 | 6/2003 | Fox et al. | |
| 6,590,529 B2 | 7/2003 | Schwoegler | |
| 6,816,878 B1 | 11/2004 | Zimmers et al. | |
| 6,823,263 B1 | 11/2004 | Kelly et al. | |
| 7,212,922 B1 * | 5/2007 | Longacre et al. | 702/3 |
| 2001/0003846 A1 | 6/2001 | Rowe et al. | |
| 2002/0130899 A1 * | 9/2002 | Ryan et al. | 345/738 |
| 2004/0073482 A1 | 4/2004 | Wiggins et al. | |
| 2005/0216324 A1 | 9/2005 | Maithell et al. | |

FOREIGN PATENT DOCUMENTS

| | | |
|---|---|---|
| EP | 0 601 254 | 6/1994 |
| JP | 10332840 | 12/1998 |
| WO | WO 9815122 | 4/1998 |

OTHER PUBLICATIONS

Chakravarty, Dipto et al., Solution for the Internet and the Enterprise, Building Rich-media Digital Asset Management Systems with XML, http://www.artesia.com/info_xml.html, Jan. 21, 2001, pp. 1-9.

(Continued)

*Primary Examiner*—Bryan Bui
(74) *Attorney, Agent, or Firm*—Kilpatrick Stockston LLP

(57) ABSTRACT

A weather-based activity advisor that provides activity recommendations to a user based on location and a time parameters. The activity recommendations are based on assessments of the desirability of potential activities such as weather-based index values. The weather-based activity advisor may present recommended activities, facilities offering the activities, information about the activities, and information about weather conditions influencing the desirability of the activities. The activity advisor may also present supplemental information such as advertisements and related web links.

26 Claims, 2 Drawing Sheets

OTHER PUBLICATIONS

Chakravarty, Dipto, "Rich Media Storage, Solving High-end Storage Demands for Rich-media Assets," http://www.artesia.com/info_storage.html, Jan. 21, 2001, pp. 1-5.

Harack, Tom. "Harnessing the Weather." Published in GolfBusiness Magazine, Sep. 2004. http://www.golfbusinessmagazine.com/pageview.asp?doc=1114.

Helal, S. et al. "A three-tier Architecture for Ubiquitous Data Access." Computer Systems and Applications, ACS/IEE International Conference ON. 2001. Beirut, Lebanon, Jun. 25-29, 2001, Los Alamitos, CA, USA IEEE Comput. Soc., US, Jun. 25, 2001, pp. 177-180, XP010551207 ISBN: 0-7695-1165-1 paragraph [0002]; figure 1.

Melendez, W. A. et al. "The Upper Layers of the ISO/OSI Reference Model (PART II)" Computer Standards and Interfaces, Elsevier Sequoia. Lausanne, CH, vol. 5, No. 2, 1986, pp. 65-77, XP000814414 ISSN: 0920-5489 paragraph [02.2]; fig 2.1.

Petrou C and Al: "An XML-based, 3-tier Scheme for Integrating Heterogeneous Information Sources to the WWW." Proceedings. International Workshop on Database and Expert Systems Applications, XX, XX, 1999, pp. 706-710, XP002156322 paragraph [0002]; figure 1.

Stevens, L. "Consider Three-Tier Client/Server." Datamation, Technical Publishing Co. Barrington, US, vol. 42, No. 4, Feb. 15, 1996, pp. 61-62, 64, XP001179561 ISSN: 0011-6963 the whole document.

Webpage, http://www.wunderground.com/about/adinfo.asp, dated May 8, 1999 by the Wayback Machine, http://www.archive.org/web/web.php, 1 page.

AccuWeather.com, dated Oct. 13, 1999 by the Wayback Machine, http://www.archive.org/web/web.php, 2 pages.

AccuWeather.com, Affiliate Opportunities, Advertising. Webpage dated May 11, 2000 by the Wayback Machine, http://www.archive.org/web/web.php, 2 pages.

"Climatology." Published by Longitudes Group., 2003. http://www.longitudesgroup.com/climate.html, 1 page.

"Next Generation Content Management, File Systems and Databases—The Hybrid Architecture," www.Interwoven.com/developer/products/hybric_arch.html, Nov. 7, 2000, pp. 1-3.

"Time-to-Web is Everything, Secure your Future with Interwoven," www.Interwoven.com/customers, Dec. 12, 2000, p. 1-2.

"Content Replication and Syndication, Mobilizing for the Content Explosion," www.Interwoven, com/developer/products/replication.html, Nov. 7, 2000, pp. 1-5.

"Interwoven Customers," www.Interwoven.com/customers/customers/html, Dec. 12, 2000, pp. 1-3.

"My Local Page," www.accuweather.com/adcbin/index, Feb. 22, 2000, pp. 1-2.

"Welcome to WeatherPager!," http://www.weatherpager.com, Feb. 22, 2000, p. 1.

"Welcome to WeatherPager!," http://www.accuweather.com/www/vol5/weatherpager/features.html, Feb. 22, 2000, pp. 1-4.

"AccuDate(r)—The World's Largest Weather Database," http:\\www.accuweather.com/wx/accudata/index/htm, Feb. 22, 2000, pp. 1-2.

"Welcome to AccuWeather Direct (tm)," http:\\direct.accuweather.com/, Feb. 22, 2000, pp. 1-2.

"Sign Up For AccuWeather Direct (tm)," http:\\direct.accuweather.com/ewxsignup/signup, Feb. 22, 2000, p. 1.

"AccuWeather Direct (tm) Sample Products," http://direct.accuweather.com/eweather/samplesind.htm, Feb. 22, 2000, p. 1.

"Sign Up for AccuWeather Direct (tm)," http://direct.accuweather.com/eweather/terms.htm, Feb. 22, 2000, pp. 1-3.

"About AccuWeather Direct (tm)," http://direct.accuweather.com/eweather/about.htm, Feb. 22, 2000, p. 1.

"AccuWeather Direct (tm)," http://direct.accuweather.com/eweather/sample.htm, Feb. 22, 2000, p. 1.

* cited by examiner

WEATHER-BASED ACTIVITY ADVISOR

TECHNICAL FIELD

The present invention relates to systems and methods of delivering weather-based activity and facility information over an infrastructure such as the Internet and, more particularly, to systems and methods for delivering information on and recommendations for activities and facilities for those activities using information such as the current weather, the weather forecast, the available activities, the proximity of those activities, and the consumer's interests and preferences.

BACKGROUND

The Internet is a rapidly developing source of weather related information. Consumers of weather information generally fall into three categories: weather enthusiasts who genuinely have an interest in weather itself, weather planners who use weather information in planning their activities and travel, and consumers who view weather as a commodity. The weather sites on the Internet are generally focused on providing weather information and have limited content for the weather planners or enthusiasts.

Furthermore, consumers generally have to go through several layers of navigation before reaching weather information that is useful for planning purposes. The weather information that is available for planning purposes is generally a subset of weather information that may be of interest for planning an event or activity. Some of the weather sites are therefore cumbersome and complicated to use for weather planning purposes. For a more in depth explanation of the deficiencies of weather information for weather planning purposes see U.S. patent application Ser. No. 09/766,295 to Ryan, et al. entitled "Weather Information Delivery Systems and Methods Providing Planning Functionality And Navigation Tools" and U.S. patent application Ser. No. 09/707,335 entitled "Targeted Weather Information Delivery Systems and Methods," both incorporated herein by this reference.

A need exists for weather sites that can provide better services to the weather enthusiasts and weather planners and, in particular, merge weather information and other content with activities-based content. U.S. patent application Ser. No. 09/766,295 to Ryan ("the Ryan application") has partially addressed this concern by presenting navigation and planning functionality that ties weather information to specific activities, such as golf at a particular course or weather conditions for an outdoor sporting event. The Ryan application provides a What/Where search tool that consumers can use to plan a certain activity at a certain location. As described, if a consumer is interested in playing golf in Abilene, Tex., for example, the consumer can search using "Abilene, Tex." (the where) and "plan for golf" (the what) and receive golf planning information such as weather and other information specific to golfing in Abilene, such as a list of golf courses near Abilene, current observations at those courses, distance of the golf courses from the geographical location of interest, cost of the courses, availability at the courses, and level of difficulty.

The Ryan application also describes the use of an activity index page such as a golf index page. The golf index is described as "a measure of a set of weather conditions that influence the game of golf, such as temperature, humidity, lightning conditions, wind conditions, and precipitation." This allows consumers to more easily plan their activities by giving consumers the weather information tightly integrated with golf information.

In spite of the many uses and benefits of the weather-based activity planning tools described in Ryan, there continues to be a need for additional and more powerful weather-based activity planning functionality. Specifically, consumers desire a tool that can help them choose from among different activities. Consumers may not know what activities are available in a given area. Current systems also do not allow users to conveniently and easily compare activities. For example, a consumer must manually compare the results of a golf index with a fishing index to determine on a particular day which activity is favored by the current or forecasted weather conditions. Furthermore, there is a need for a system which can utilize information about a user, such as activity preferences and financial preferences and provide information and suggestions on activities.

SUMMARY OF THE INVENTION

The present invention meets the needs described above by providing a weather-based activity advisor. In one embodiment, the invention provides weather-based activity recommendations to a user, who has provided location and a time parameters. In this embodiment, activity index values reflecting the desirability of potential activities appropriate for the location, time, and the user's preferences are used to identify and display recommended activities to the user. More generally, the present invention includes an activity advisor that recommends activities based on weather conditions. In one embodiment, the activity advisor is an Internet application that recommends activities for a given geographic region for a given forecast and/or for a given user's preferences. The activity advisor may present a list of recommended activities, facilities offering those activities, information about the activities, and information about weather conditions influencing the desirability of the recommended activities. The activity advisor may also present graphics of the weather index values, recommendation information, and/or supplemental information such as advertisements related to the activities, user, or geographic area.

These and other aspects, features and advantages of the present invention may be more clearly understood and appreciated from a review of the following detailed description of the disclosed embodiments and by reference to the appended drawings and claims.

DETAILED DESCRIPTION

Figure 1:
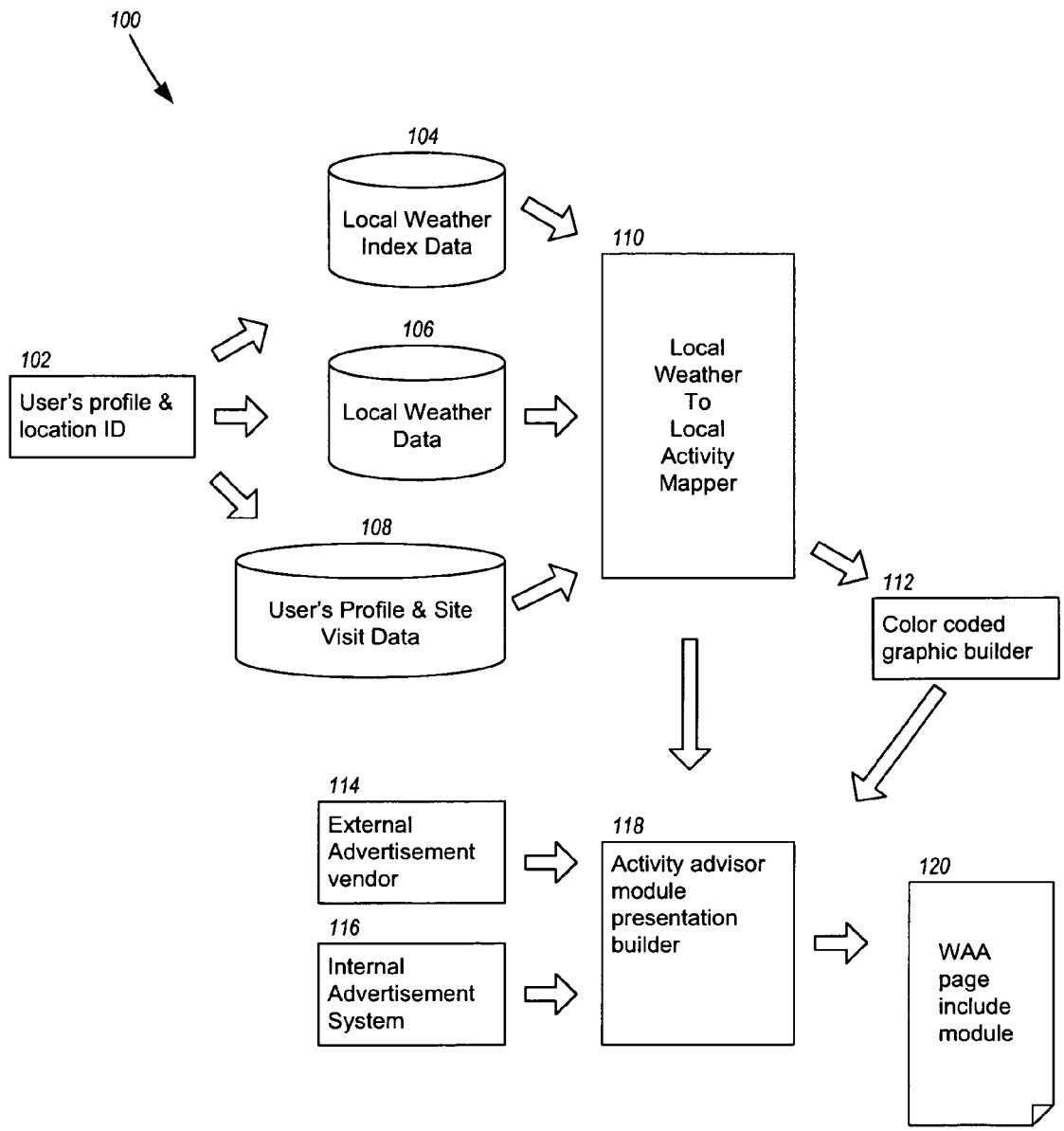
FIG. 1 is a logical diagram of an exemplary weather-based activity advisor.

The present invention is directed towards a weather-based activity advisor 100. Briefly described, the weather-based activity advisor provides activity and facility recommendations and consolidated information for a given geographic region, forecast time, and/or user's individual preferences.

On aspect of the present invention provides an activity advisor 100 that allows a user to request local activity information on an Internet website. The request may contain a location ID such as a zip code, city name, state name, or other information identifying a particular location, area, region, zone or position. In one example, the user selects the location ID by selecting an area on a map. For example, the interface provides the user with a map and the user clicks, highlights, or otherwise selects a location, area, region, zone, or position on the map. As a more specific example, the user could click on a particular location and specify that the location ID includes the area encompassed by a circle defined by a 5 mile radius from that central location. Accordingly, the location ID may be a name or an area on a map selected by a user or any other information specific enough to define the location or area of interest. Alternatively, the location could be derived from the system by, for example, retrieving default information about the user or user parameters.

The user's request may also contain time parameters, such as particular day, the upcoming weekend, or, for example, allow the user to select a time frame on a displayed calendar. Alternatively, the system could automatically determine a default time parameter.

Thirdly, the user's request may also contain user preferences, such as a list of the user's preferred activities. In an alternative embodiment, the user preferences are retrieved from a database or other electronic storage location. For example, the stored user preferences may contain information previously entered by the user as his or her user preferences. Alternatively, the user preferences may have been observed, recorded, or otherwise derived from the user's prior transactions or requests on the system.

After receiving the user's request and potentially retrieving user preferences, the activity advisor 100 calculates or retrieves a listing of all the potential activities for the location ID and time parameters. These potential activities may be calculated using an internal database or an external vendor. Examples of potential activities include both indoor and outdoor activities such as golf, tennis, skiing, boating, museums, and theater productions.

For the potential activities, the activity advisor 100 then retrieves information about the desirability of the activities. For example, for some or all of the potential activities, the activity advisor 100 may determine index values that reflect the desirability of the potential activities, based at least in part on weather data. The desirability information, such as the index values, may be retrieved from an internal database or an external vendor. The activity advisor 100 may also retrieve prior activity records for this particular user.

After determining desirability information such as index values about the potential activities, the activity advisor then identifies recommended activities using the desirability information. In one embodiment, the activity advisor 100 selects a set number of recommended activities from the potential activities having the highest index values, e.g. the five activities with the highest index values. The number of activities may be preset by the system, chosen by the user at the time of the request, chosen by the user at a prior time, or selected based on some other user or system criteria. In one embodiment, rather than having a set number of recommended activities, the activity advisor 100 recommends all of the potential activities having an index value above a certain threshold, e.g. 8 out of a possible 10. In yet another embodiment, the activity advisor may recommend indoor activities based on the index values of the outdoor activities or may recommend a combination of indoor and outdoor activities based on the index values. For example, if no outdoor activities have an index value greater than 5, then all of the recommended activities may be indoor activities. In another embodiment, the activity advisor 100 may be set up to always recommend a combination of indoor and outdoor activities but to vary the relative number of indoor to outdoor recommended activities based on the index values. For example, on a sunny day that favors many outdoor activities, the activity advisor 100 might calculate 7 outdoor activities and 3 indoor activities as recommended activities, but on a rainy day that does not favor many outdoor activities, the activity advisor 100 might select 13 indoor activities and 2 outdoor activities. Accordingly, the activity advisor 100 may be configured in a variety of different ways to satisfy a variety of different weather-based activity selection criteria.

After calculating one or more recommended activities, the activity advisor 100 next provides these recommended activities to the user. Such presentation may take a variety of different visual, video, or audio forms including documents, words, numbers, pictures, graphics, maps, lists, charts, descriptions, sounds, computer displays, web links, videos, e-mail, instant messages, phone calls, phone messages, or any other available or future media for presenting information.

Another aspect of the present invention provides an activity advisor 100 that displays, or otherwise provides access to, supplemental information along with the recommended activities. This supplemental information may includes advertisements targeted to the recommended activities, advertisements targeted to the user's preferences, or advertisements targeted to the location and/or time parameters of the user's request. The term "advertisement" as used herein is meant include any form of public announcement, broadcast, or notice whether or not commercial in nature. To provide advertisement information as supplemental information, activity advisor 100 may query internal advertisement databases and system and/or external advertisement providers, such as Google™ for advertisements, related to activities and events for the user's geographic region. In addition to advertisement-type supplemental information, the supplemental information may also include data, lists, pictures, sounds, videos and other forms of information about one or more of the recommended activities such as a picture of the facility. The supplemental information may include a web link or other electronic link to the related information and content. The activity advisor 100 may also package and return to the user suggested activities along with the supplemental information. Accordingly, one aspect of the present invention is to provide activity advice in conjunction with one or more pieces of supplemental information that is related to the recommended activities or the display of the recommended activities, such as advertisements, that third parties may pay to have displayed.

The activity advisor 100 of the present invention provides the functions described herein by compiling weather conditions and weather indexes, mapping these to the activities in a particular geographic region based on pre-defined rules. These rules may be changed or tailored to provide different functions or to meet varying consumer preferences.

Exemplary System

FIG. 1 illustrates an exemplary logical diagram for a weather-based activity advisor 100. As shown, the activity advisor 100 applies a user's profile and a location ID 102 to local weather index data 104, local weather data 106, and the user's profile and site visit data 108. The user's location ID 102 may include location identifying information such as zip code and/or address information either entered by the user or detected by the system. The user's profile preferences may include a list of preferred activities and/or non-preferred activities, a list of allergies, and a list of travel preferences, such as how far the consumer prefers to travel for weekend recreation. Other preferences are of course possible. The user's location and preference information may be inputted by the user at the time the user requests the activity advisor or, alternatively, may be stored and retrieved by the activity advisor or associated applications and systems. For example, such information could be calculated based on prior transactions conducted by the user and stored as part of a user's profile & site visit data 108.

Local weather index data 104 includes index values such as the golf index, ski index, beach index, and other information. The index data used in the present invention may, but is not required to, provide a numerical assessment of a given activity's desirability given the current or forecasted weather conditions. For example, a golf index may provide a value between 0 and 10 indicating the golf conditions for a particular course or particular geographic region for a given day or time. A value of 10 might indicate the best possible golfing conditions and a value of 0 might indicate the worst. Alternatively, the weather-based activity index could provide more qualitative information about an activity or facility. For example, the golf index might indicate there is a risk of lightning. The weather index could, of course, also incorporate both quantitative and qualitative information. The article *Harnessing the Weather*, by Tom Harack suggests a system that provides a rating (6.5) and an accompanying notation ("bring a sweater"). Activity indexes may be used for individual facilities offering those activities. For example, golf in zip code 30305 may have a golf index of 6.5 on a given day while, golf at a particular facility or course within the zip code, e.g. Bobby Jones Golf Course, may have a golf index of 6.8.

The activity advisor 100 applies, combines, or otherwise uses rules to map this information and data 102, 104, 106, 108 using a local weather to local activity mapper 110. The local weather to local activity mapper 110 gets the local weather data 106 and local weather index data 104 from an internal database in the embodiment shown in FIG. 1. The local weather to local activity mapper 110 also retrieves any prior activity recorded for this particular user from the user's profile & site visit data 108. This weather and user information is mapped to determine the desirability of available activities and facilities in the geographic location. The local weather to local activity mapper 110 thus analyzes and maps the user's request with the recommended activities and facilities for the given weather data and indexes. As described above, this mapping may include using a threshold index value or a comparison of index values to identify recommended activities for a given geographic location, time parameter, and user preferences.

The activity advisor 100 presents or otherwise reports the recommendation information to the user. The information may be displayed on a computer screen using words, lists, graphics, pictures, maps, charts, descriptions, web links, or videos. The information may be presented audibly using a telephone, telephone answering system, or other computer audio equipment. The information may also be presented by e-mail, instant messages, or any other available or future media for presenting information.

Figure 2:
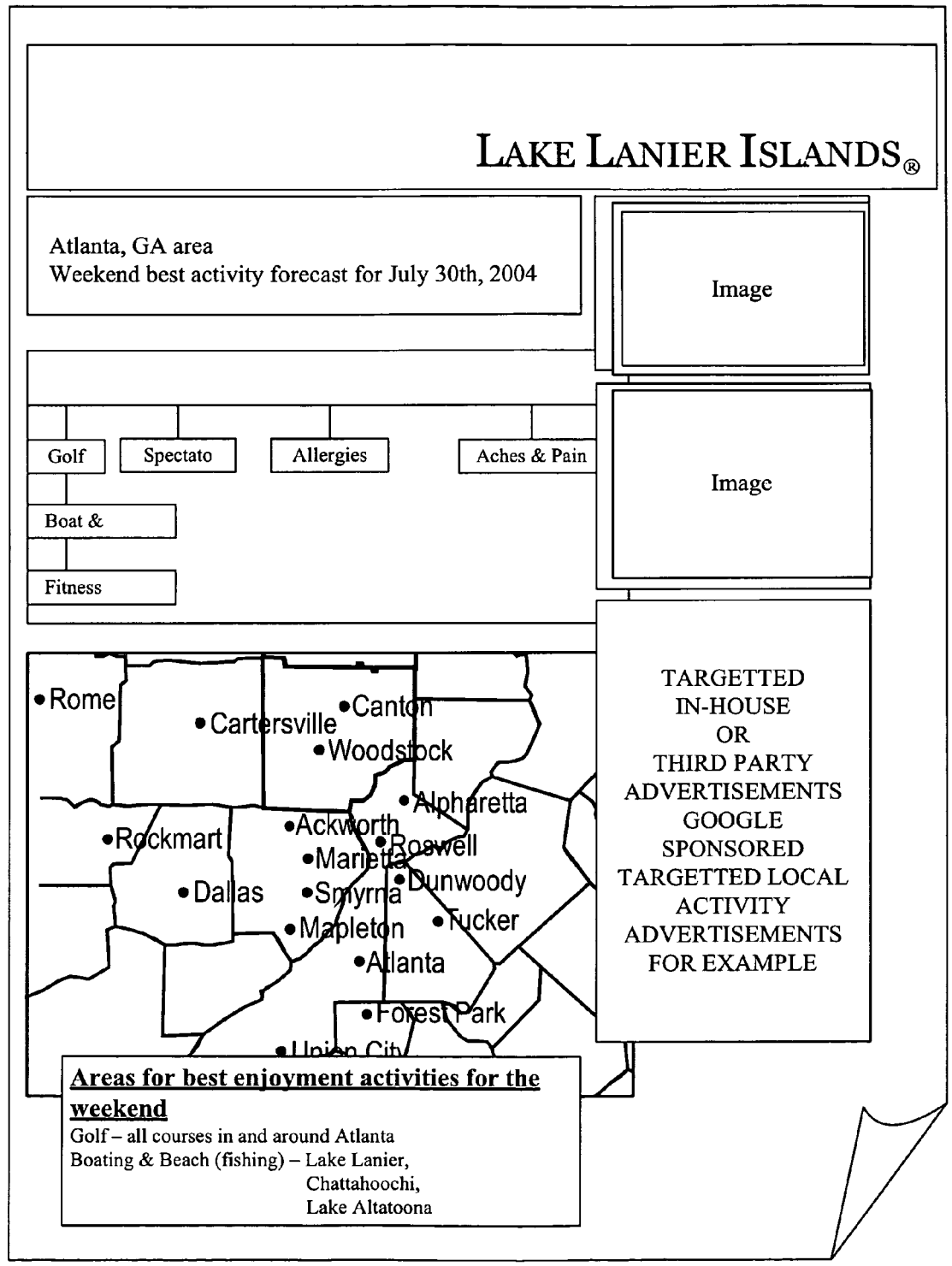
FIG. 2 is an exemplary activity advisor webpage.

FIG. 1 shows a color coded graphic builder 112 that provides graphical compilation of weather and index information for different activities. A color coded graphic is shown in FIG. 2 which shows a spectrum from green on the left to red on the right where activities such as golf, boating, and fitness are farther toward the green side than spectator sports. This type of visual reporting method allows the activity advisor 100 to illustrate a range of activities from the most preferable to the least preferable. Activity advisor module presentation builder 118 uses information from the local weather to local activity mapper 110, graphics from the color coded graphic builder 112, advertisements from the external advertisement vendor 114, and/or advertisements from the internal advertisement system 116 to produce an activity advisor web page 120, such as the one shown in FIG. 2.

The User's Preferences

As described above, the activity advisor 100 maps weather conditions and weather indexes to activities in a particular geographic region based on pre-defined rules. These rules may include or take into account a variety of considerations. The activity advisor 100 may use the proximity of the activity to the user, the user's proximity preferences, and the user's travel preferences, among other proximity and location preferences. The activity and facility searching and mapping performed by activity advisor 100 may be based on zip code, region, proximity to an address, or any other method of defining a geographic region of interest.

Accordingly, location and proximity preference information may be incorporated into rules that recommend convenient activities to the consumer according to their own convenience preferences. In another aspect of the present invention, consumer have the ability to specify a desired maximum distance and travel time requirements. For example, the user could request activities and facilities within 5 miles or within a 10 minute drive from a certain location, e.g. her house. The activity advisor 100 can plot desirable facilities and activities based on the user's specification of desired distance or travel time.

In another aspect of the present invention, consumers may also specify a maximum activity cost, such as $20 per person, or provide preferences with respect to the level of difficulty of physical exertion needed, e.g. requesting activities that are not physically strenuous. Additionally, consumers may limit or target the search based on their physical requirement, handicaps, restroom requirements, pet requirements, travel requirements (only paved roads), time of day requirements, and length of activity requirements. A variety of other user preferences are of course possible and may be incorporated into the activity advisor 100 activity selection rules.

The user's preferences may be inputted by a consumer using a user preference interface. For example, a web page could allow the user to input a desired location by specifying a zip code, address, or other geographic region or by making a selection on a map. Such a user preference interface could allow other preferences to be submitted on the same webpage and saved for later use for a given consumer. Alternatively, the activity advisor 100 or related systems could observe and track a user's prior transactions and activities on the Internet to calculate and save user preference information.

Associated Locations

The pre-defined rules may also take into account preexisting associations between locations or otherwise recognize related locations. For example, Lake Lanier may be associated with Atlanta. Such an association may be made in cases where one location offers events and activities not available at the requested location. In this example, although Lake Lanier is about 40 miles from Atlanta, it offers boating and other lake activities that may not be available to someone looking for such activities in Atlanta. Pre-associations between locations can be made for other reasons, such as to associate relatively nearby locations offering particular or unusual points of interest or to associate certain locations or facilities based on advertiser requests or advertising contracts. The selection of associated location may be based on whether the associated location is within a preset distance from the location ID or whether the travel time from the Location ID to the associated location is less than a preset value.

Returning to the present example, when the consumer requests activity information in and around Atlanta, the activity advisor 100 identifies boating and other activities or facilities at Lake Lanier along with the more local activities and facilities in Atlanta. In such a case, the activity advisor 100 could check the weather conditions at both locations in making its recommendations. Accordingly, when boating weather conditions at Lake Lanier are preferable to golf conditions in Atlanta, the activity advisor 100 will use this information to recommend boating as the more preferable activity.

In one embodiment of the present invention, there are two or more levels of weather checking during the rules processing. The activity advisor 100 first checks the local weather to determine the desirability of activities and facilities in the specific location identified by the user's request. The activity advisor 100 then determines nearby associated locations, identifies activities of interest in those locations, and checks the weather conditions in those locations and facilities to determine the desirability of those activities and facilities based on the weather conditions. Accordingly, the activity advisor 100 may act as an intelligent decision system, by repeatedly searching and researching based on its initial search results and weather information to select desirable activities. For example, the activity advisor 100 may determine that golf and hiking conditions are relatively undesirable for locations within 10 miles of the consumer's home but that if the user is willing to travel 20 miles south, the conditions are excellent for golf and very good for hiking.

Facility Locator

The following exemplary embodiment is used to further illustrate and describe the systems and methods of the present invention with respect to locating particular facilities offering desirable activities. In this embodiment a user initiates the activity advisor 100 by entering a location alone and requesting activity advice from the activity advisor 100. In this example, the user enters Atlanta, Ga. The activity advisor 100 first checks the weather-based activity indexes and weather data in and immediately surrounding Atlanta, Ga. This check returns a list of activities and the associated index values or some other indicia of desirability for those activities. The activity advisor 100 in the example also checks for preassociated locations and facilities. This may include specific local golf courses, tennis courts, hiking trails, and may also include regional activities and facilities that are outside of the local vicinity. The activity advisor 100 checks the index values for the individual facilities and determines their individual desirability. Based on this determination, the activity advisor 100 can recommend activities and facilities to the consumer.

The activity advisor 100 uses predefined rules to identify activities and facilities based on the returned index values. In this example, the activity advisor 100 identifies all activities and facilities with an activity index value greater than 9, the initial threshold value. If none exist, the activity advisor 100 may identify all activities and facilities with an activity index value above 8. If none exist, the activity advisor 100 may identify all activities and facilities with activity index value above 7. And so on, until an appropriate number of activities and facilities (for example 6) have been identified. As another example, the activity advisor 100 may search until it has identified 3 or more activities—e.g. golf, tennis, and hiking at Cochran Shoals National Recreation Area.

Presentation of Information and Recommendations to the Consumer

The activity advisor 100 may provide information to the consumer in a variety of ways, including methods that use maps, lists, charts, graphics, pictures, directions, descriptions, colors, shapes, weblinks, embedded objects, files, sounds, videos, and a variety of other media and illustrations. The information may be presented audibly using a telephone, telephone answering system, or other computer audio equipment. The information may also be presented by e-mail, instant messages, or any other available or future media for presenting information.

In one aspect of the present invention the activity advisor 100 draws a color coded graphic showing all weather indexes dynamically. It then packages and returns an activity graph, weather indexes, and a list of suggested activities and events. In an another embodiment, the user could set up a recurring activity search that could be sent to them each week or each month. The user could receive this information, for example, every Friday by e-mail. Accordingly, a variety of methods of delivery and presenting the activity advisor 100 information are envisioned in the present invention and it is not intended that the invention be limited to any particular types of information transfer or presentation technique.

Recommendation information may be presented to the user graphically using maps and other illustrations that may highlight desirable areas and/or weather conditions. An example of a presentation component is a webpage with a map showing desirable golf locations as shaded regions. As another example, the activity advisor 100 could highlight on a map all regions that have a golf index above a certain threshold value, e.g. 8 out of a possible 10. The activity advisor 100 could recommend the closest golf course with a golf index greater than 10.

Other embodiments of the present invention allow the user to search activity indexes for one or more activities such as golf to determine the most desirable activity. The activity advisor may provide a map showing the location of the recommended activities. For example, it could show the three closest golf courses, the two closest tennis courts, a nearby walking trail, etc.

The activity advisor 100 may provide useful activity information by dynamically plotting maps showing activity and/or weather information. FIG. 2 illustrates a map showing highlighted regions for a recommended activity. The activity advisor 100 may display weather and other information about each activity and facility described. For example, the display may show or provide links to web information that shows that hiking at Cochran Shoals National Recreation Area has a hiking index value of 10 for tomorrow, that the parking fee is $2 per day or $35 for an annual pass, that dogs are allowed, and may list any other relevant information that is useful to, and possibly requested by, the consumer, such as time of sunset, poisonous snakes in the region, whether restrooms are available, whether the facilities are handicap accessible, etc. In short, the user's preferences may be tied to the ultimate output of the activity advisor 100. If the user identifies a concern or preference, the output, such as a displayed website, can provide specific information about that preference for each of the activities suggested. Generally, the activity advisor 100 may provide biological, environmental, geologic, geographic, topographic, astrological and other forms of information that relate to the user's preferences or the recommended activities.

ALTERNATIVE EMBODIMENTS

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Many alternative embodiments are possible without departing from the spirit and scope of the invention.

What is claimed is:

1. A method of providing weather-based activity information to a user comprising:
   receiving a location ID and a time parameter;
   in response to receiving the location ID and the time parameter, determining a plurality of index values for a plurality of potential activities for the location ID and time parameter, wherein the index values reflect desirability of the potential activities based at least in part on forecasted weather conditions, wherein index values for more desirable potential activities are greater than index values for less desirable potential activities;
   identifying some of the potential activities as recommended activities, wherein the recommended activities are identified by comparing the index values of the potential activities and selecting the potential activities having index values greater than a threshold value; and
   providing the plurality of recommended activities to the user.

2. The method of claim 1 wherein determining the plurality of index values for the potential activities comprises selecting the potential activities based on user preferences.

3. The method of claim 1 further comprising:
   retrieving user preferences for the user from a stored location; and
   identifying the plurality of recommended activities using the index values and the user preferences.

4. The method of claim 3 wherein the user preferences includes information from the user's past transactions.

5. The method of claim 1 further comprising:
   identifying a recommended facility offering one of the recommended activities.

6. The method of claim 1 further comprising:
   selecting additional activities at an associated location, wherein the additional activities are different from the plurality of potential activities; and
   determining index values for the additional activities.

7. The method of claim 6 wherein the associated location is within a preset distance from the location ID.

8. The method of claim 6 wherein the travel time from the location ID to the associated location is less than a preset value.

9. The method of claim 1 further comprising displaying a color coded graphic showing desirability of the recommended activities.

10. The method of claim 1 further comprising graphically providing the recommended activities to the user.

11. The method of claim 1 further comprising graphically providing the recommended activities to the user on a map.

12. The method of claim 1 further comprising graphically providing the recommended activities to the user by highlighting a portion of the map.

13. The method of claim 1 further comprising providing advertisements targeted to the plurality of recommended activities.

14. The method of claim 1 further comprising providing supplemental information to the user.

15. The method of claim 14 wherein the supplemental information includes a map.

16. The method of claim 14 wherein the supplemental information includes a map having a highlighted portion for showing information related to the recommended activities.

17. The method of claim 14 wherein the supplemental information includes advertisements targeted to the user's preferences.

18. The method of claim 14 wherein the supplemental information includes advertisements targeted to the location ID.

19. The method of claim 14 wherein the supplemental information includes advertisements targeted to the time period.

20. The method of claim 14 wherein the supplemental information includes information about one or more of the plurality of recommended activities.

21. The method of claim 14 wherein the supplemental information includes web links to websites offering products or information related to the recommended activities.

22. A weather-based activity recommendation system comprising:
   a receiving component for receiving a location ID and a time parameter;
   a potential activity identifying component for determining a plurality of index values for a plurality of potential activities for the location ID and time parameter wherein the index values reflect desirability of the potential activities based at least in part on forecasted weather conditions, wherein index values for more desirable potential activities are greater than index values for less desirable potential activities;
   an activity selection component for identifying a plurality of recommended activities, wherein the recommended activities are identified by comparing the index values of the potential activities and selecting the potential activities having index values greater than a threshold value; and
   a presentation component for providing the plurality of recommended activities to the user.

23. A method of providing weather-based activity information to a user comprising:
   receiving a location ID and a time parameter;
   in response to receiving the location ID and the time parameter, determining a plurality of index values for a plurality of potential activities for the location ID and time parameter, wherein the index values reflect desirability of the potential activities based at least in part on forecasted weather conditions, wherein index values for more desirable potential activities are less than index values for less desirable potential activities;
   identifying some of the potential activities as recommended activities, wherein the recommended activities are identified by comparing the index values of the potential activities and selecting the potential activities having index values lower than a threshold value; and providing the plurality of recommended activities to the user.

24. A weather-based activity recommendation system comprising:

a receiving component for receiving a location ID and a time parameter, a potential activity identifying component for determining a plurality of index values for a plurality of potential activities for the location ID and time parameter wherein the index values reflect desirability of the potential activities based at least in part on forecasted weather conditions, wherein index values for more desirable potential activities are less than index values for less desirable potential activities;

an activity selection component for identifying a plurality of recommended activities, wherein the recommended activities are identified by comparing the index values of the potential activities and selecting the potential activities having index values lower than a threshold value; and a presentation component for providing the plurality of recommended activities to the user.

25. A method of providing weather-based activity information to a user comprising:

receiving a location ID and a time parameter;

in response to receiving the location ID and the time parameter, determining a plurality of index values for a plurality of potential activities for the location ID and time parameter, wherein the index values reflect desirability of the potential activities based at least in part on forecasted weather conditions, wherein index values for more desirable potential activities are greater than index values for less desirable potential activities;

identifying some of the potential activities as recommended activities, wherein the recommended activities are identified by comparing the index values of the potential activities and selecting a set number of activities having the highest index values; and providing the plurality of recommended activities to the user.

26. A method of providing weather-based activity information to a user comprising:

receiving a location ID and a time parameter;

in response to receiving the location ID and the time parameter, determining a plurality of index values for a plurality of potential activities for the location ID and time parameter, wherein the index values reflect desirability of the potential activities based at least in part on forecasted weather conditions, wherein index values for more desirable potential activities are less than index values for less desirable potential activities;

identifying some of the potential activities as recommended activities, wherein the recommended activities are identified by comparing the index values of the potential activities and selecting a set number of activities having the lowest index values; and providing the plurality of recommended activities to the user.

* * * * *